US012582028B2

(12) United States Patent
      Noll

(10) Patent No.: US 12,582,028 B2
(45) Date of Patent: Mar. 24, 2026

(54) LINKAGE FOR CUTTERBAR OF HEADER FOR AGRICULTURAL VEHICLE

(71) Applicant: CNH Industrial America LLC, New Holland, PA (US)

(72) Inventor: Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 406 days.

(21) Appl. No.: 18/144,891

(22) Filed: May 9, 2023

(65) Prior Publication Data

US 2024/0373783 A1    Nov. 14, 2024

(51) Int. Cl.
      A01D 34/04     (2006.01)
      A01D 34/28     (2006.01)
      A01D 61/02     (2006.01)
      A01D 61/00         (2006.01)

(52) U.S. Cl.
      CPC ........... A01D 34/283 (2013.01); A01D 34/04 (2013.01); *A01D 61/008* (2013.01); *A01D 61/02* (2013.01)

(58) Field of Classification Search
      CPC ............................ A01D 34/283; A01D 34/246
      See application file for complete search history.

(56) References Cited

U.S. PATENT DOCUMENTS

| | | | |
|---|---|---|---|
| 1,458,367 A | 6/1923 | Smith | |
| 1,923,921 A | 8/1933 | Dessel | |
| 2,304,422 A | 12/1942 | Rogers | |
| 4,441,307 A | 4/1984 | Enzmann | |
| 7,207,164 B2 | 4/2007 | Bomleny | |
| 7,802,417 B2 | 9/2010 | Sauerwein et al. | |
| 7,926,248 B2* | 4/2011 | Schmidt ................. | A01D 43/06 |
| | | | 56/181 |
| 10,349,578 B2 | 7/2019 | Cook | |
| 10,791,671 B2 | 10/2020 | Shearer | |
| 11,483,971 B2 | 11/2022 | Ricketts et al. | |
| 2019/0029175 A1 | 1/2019 | Talbot et al. | |
| 2021/0112713 A1 | 4/2021 | Martin et al. | |
| 2021/0112715 A1* | 4/2021 | Ricketts ................. | A01D 43/06 |

FOREIGN PATENT DOCUMENTS

| | | |
|---|---|---|
| DE | 2915245 A1 | 11/1979 |
| GB | 691075 | 5/1953 |

* cited by examiner

*Primary Examiner* — Cathleen R Hutchins
(74) *Attorney, Agent, or Firm* — Buchanan Ingersoll & Rooney PC

(57)                    ABSTRACT

A header for an agricultural vehicle includes a header frame. At least one support member extends from a respective proximal end at the header frame to a respective distal end located forward of the header frame. The support member is pivotable relative to the header frame. A cutterbar assembly is mounted to a distal end of the support member. A joint or linkage pivotably connects the cutterbar assembly to the support member.

16 Claims, 6 Drawing Sheets

LINKAGE FOR CUTTERBAR OF HEADER FOR AGRICULTURAL VEHICLE

FIELD OF THE INVENTION

This invention is generally directed to a linkage for an agricultural vehicle header, such as a combine harvester, that permits relative movement of a cutter bar with respect to a flex arm of the header.

BACKGROUND OF THE INVENTION

As described in U.S. Patent App. Pub. No. 2021/0112713, which is incorporated by reference in its entirety and for all purposes, agricultural equipment, such as combines, swathers and windrowers, typically include a header that is movably attached to the chassis of the vehicle. The header typically is located at the front of the vehicle, and extends laterally relative to the vehicle's forward direction of travel. U.S. Patent Pub. No. 2019/0029175, which is incorporated by reference herein, describes a header having a cutter bar (17) mounted to the feeder housing by a multi-bar linkage, with suspension springs (24) to allow the cutter bar to float, and a tilt-control actuator (26) to change the orientation of the cutter bar. A similar arrangement is shown in U.S. Pat. No. 7,207,164, which is also incorporated by reference herein, in which the header includes a cutter bar subframe (52) that floats on a subframe (64) on lower and upper links (66, 68).

The cutterbar is typically fixedly mounted to a structural frame member, such as a flex arm, of the header. Depending upon the orientation of the flex arm, if the vehicle encounters an uneven surface, hill, bump or dip in the ground, the cutterbar can directly contact the ground thereby resulting in damage to the cutterbar.

In view of the foregoing, it would be beneficial to either prevent or limit such damage by mounting the cutterbar such that it is moveable with respect to the flex arm, or vice versa.

This description of the background is provided to assist with an understanding of the following explanations of exemplary embodiments, and is not an admission that any or all of this background information is necessarily prior art.

SUMMARY OF THE INVENTION

In one exemplary aspect, a header for an agricultural vehicle includes a header frame. At least one support member extends from a respective proximal end at the header frame to a respective distal end located forward of the header frame. The support member is pivotable relative to the header frame. A cutterbar assembly is mounted to a distal end of the support member. A joint or linkage pivotably connects the cutterbar assembly to the support member.

BRIEF DESCRIPTION OF THE DRAWINGS

Embodiments of inventions will now be described, strictly by way of example, with reference to the accompanying drawings, in which.

In the figures, like reference numerals refer to the same or similar elements. In the figures, various components have been omitted to reveal other components.

DETAILED DESCRIPTION OF THE DRAWINGS

Exemplary embodiments of the present invention provide suspension systems for headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
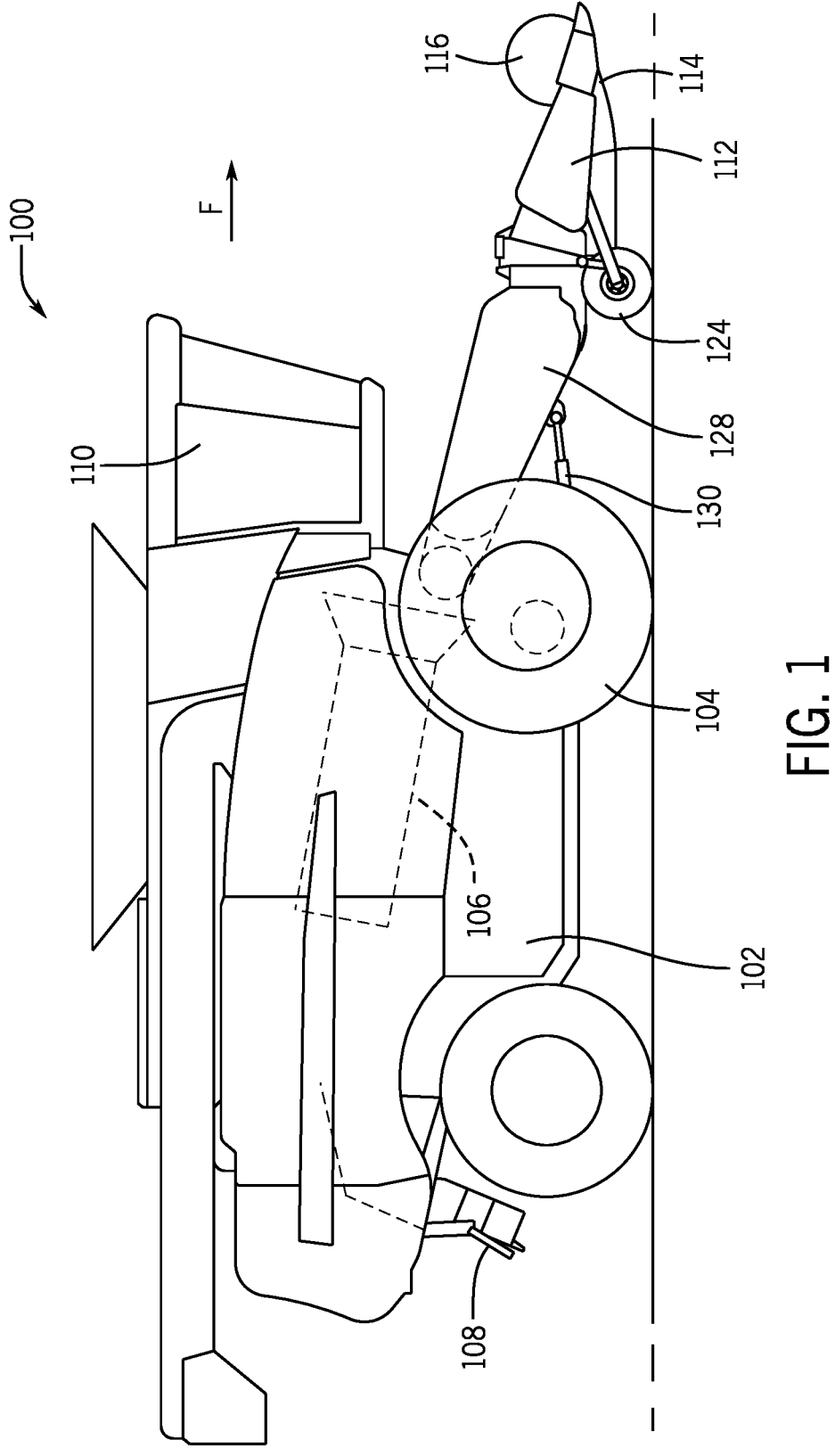
FIG. 1 is a side view of an agricultural combine.

FIG. 1 illustrates an example of an agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
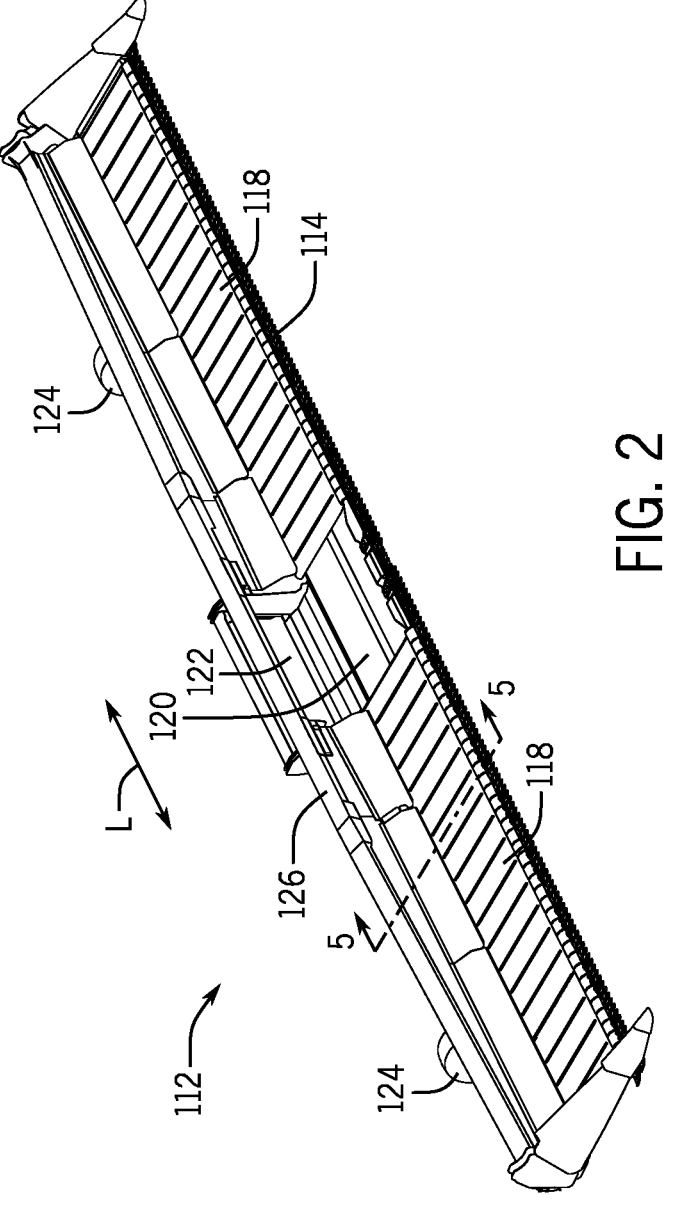
FIG. 2 is an isometric view of a header for the combine.
Figure 3:
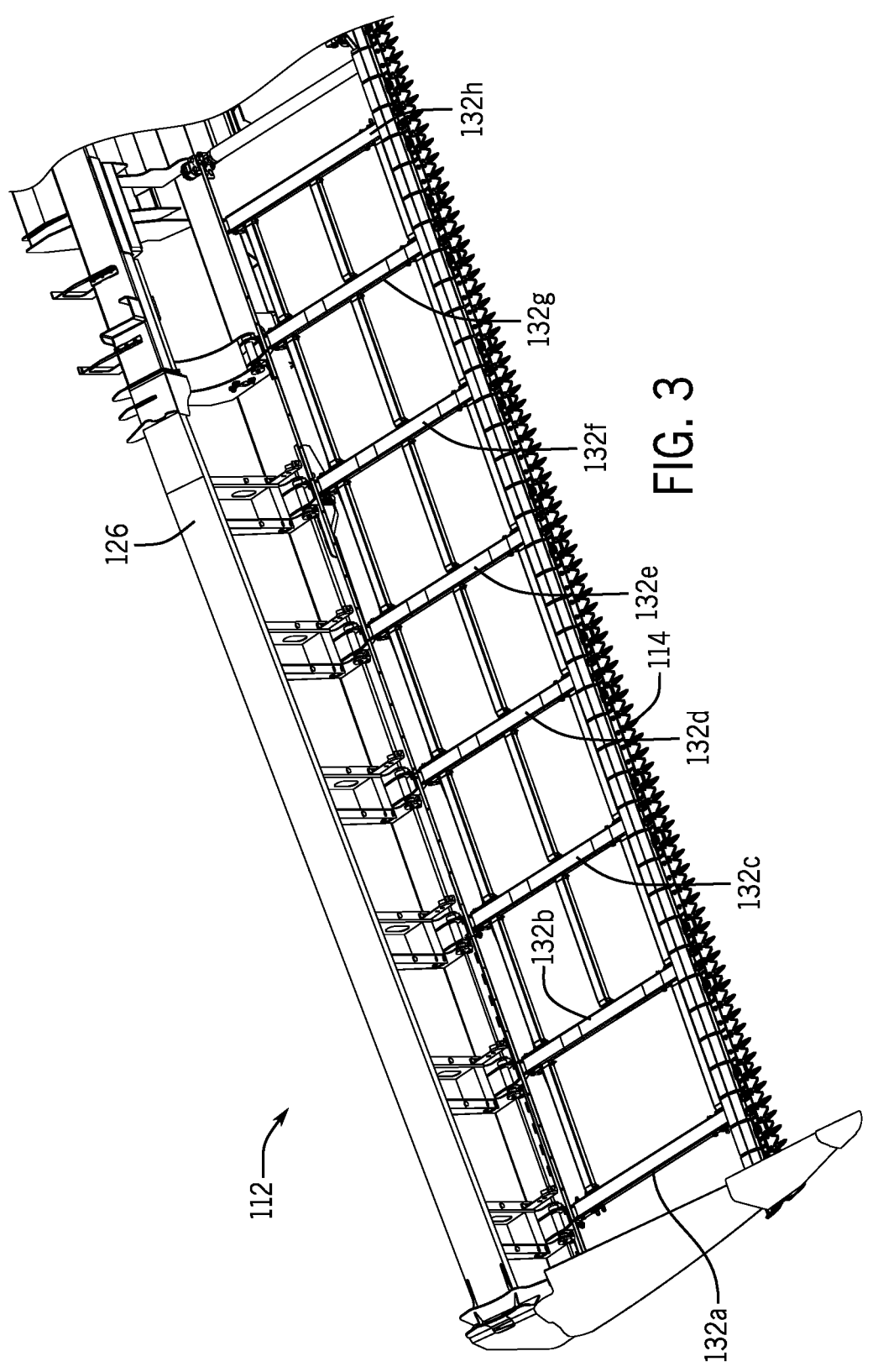
FIG. 3 is an isometric view of a portion of a header frame of the header.

Referring also to FIGS. 2 and 3, the combine 100 also includes a header 112, which is configured to cut and harvest crop material from the ground as the combine 100 drives in the forward direction F (FIG. 1). For example, the header 112 may include one or more cutter bars 114 located at or near the leading edge of the header 112 to cut crops at or near the ground level, and one or more reels 116 (not shown in FIG. 2) configured to pull the crop material backwards towards the header 112. The header 112 includes belts 118 that are configured to move the crop material at the lateral ends of the header 112 towards the center of the header 112. At the center, the header 112 may include a feeder belt 120 (and/or auger), in the form of a belt (for example) that conveys the crop material backwards towards a crop outlet 122. The header 112 also may include gauge wheels 124 or skids to control the height of the header 112 over the ground.

The header 112 is built on a frame 126, which is attached to the chassis 102 of the combine 100 by a feeder housing 128 (feederhouse). The feeder housing 128 is configured to convey crop material backwards from the header 112 to the threshing and separating system 106, as is known in the art. The feeder housing 128 may be movable by one or more feeder housing actuators 130 to raise and lower the header 112 relative to the ground.

The illustrated exemplary header 112 is a unitary header having a single frame 126 that extends continuously between the ends of the header 112 in the lateral direction L. The header 112 may include a center section and one or more wing sections extending from the center section. Those sections may be fixedly connected together. In other embodiments, the header 112 may comprise a multi-segment or articulated header in which the wing sections are movably attached to the lateral end of the center section by pivots or linkages.

The header 112 also includes a number of supports 132a-132h (referred to either individually or collectively as support(s) 132) that extend longitudinally forward from the frame 126 in the direction 'F.' Supports 132 hold parts such as the cutter bar 114, belts 118, or the like. The supports 132 may be rigidly attached to the header 112, or attached by movable mounts, such as pivots or linkages. In the case of movable supports 132, a suspension may be used to control the motion of the supports 132. For example, each support 132 may have its own spring and/or damper system, which is intended to allow the supports 132 to move up and down individually or in groups to follow local undulations along the lateral direction L. Such supports 132 may be referred to in the art as flex arms. One or more of the supports 132 may also be driven rollers for driving the belt 118 that is positioned thereon.

Figure 4:
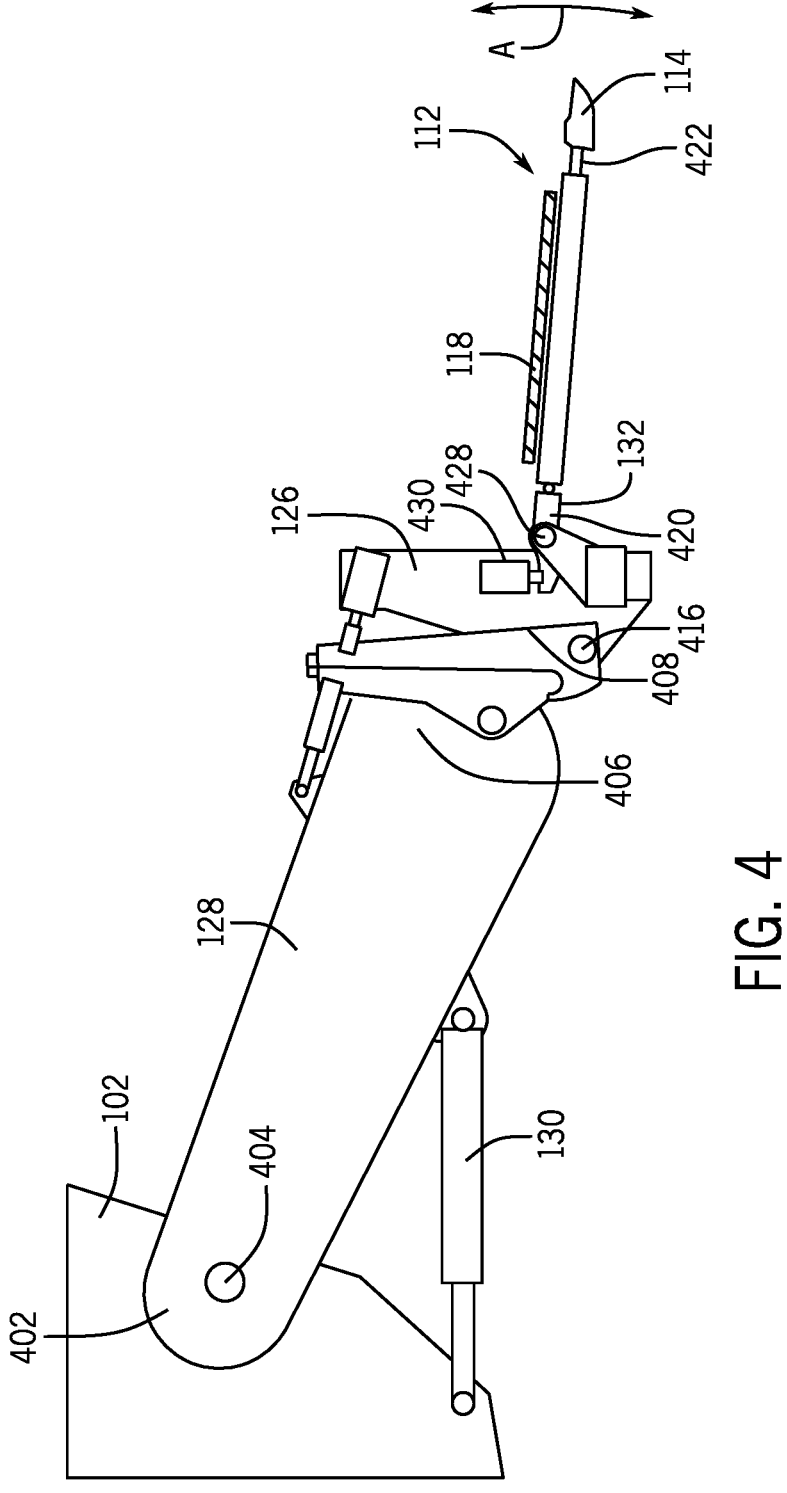
FIG. 4 is a side view of a header and combine feeder illustrating a header suspension of the header.

Referring now to FIG. 4, the proximal end 402 of the feeder housing 128 is mounted to the chassis 102 at a pivoting joint 404, such as a hinge or trunnion, and the distal end of the feeder housing 128 is connected to the header 112. Feeder housing actuator 130 connects the feeder housing 128 to the chassis 102, and is operable to raise and lower the distal end 406 of the feeder housing 128 relative to the ground.

The header 112 includes an anchor plate 408 that is rigidly connected to the distal end 406 of the feeder housing 128. The header frame 126 is pivotally connected to the anchor plate 408 by a frame pivot 416, such as one or more hinges or trunnion connections. In the shown example, the frame 126 has a plurality of supports 132 that extend from respective proximal ends 420 to respective distal ends 422 located forward of the frame in the forward direction F. Each support 132 is configured to support one or more operative components, such as a draper belt roller or a portion of cutter bar 114.

In the shown example, the proximal ends 420 of all of the supports 132 are movably mounted to the frame 126 to rotate about respective support pivots 428. Thus, the distal ends 422 of the supports 132 are movable in an arcuate path A relative to the frame 126. The angular positions of the supports 132 may be adjustable, such as by adjusting the state of extension of a pneumatic spring/damper 430, a hydraulic spring 430, a mechanical spring (e.g. torsion bar or coil spring) 430, or the like, or other suspension systems or adjusting mechanisms, as known in the art. The supports 132 may include any type of local suspension to control motion relative to the frame 126. For example, each support 132 may be mounted by a flexible mount such as a torsion link as described in U.S. Pat. No. 8,051,633, which is incorporated herein by reference. It will also be appreciated that one or more supports 132 may be fixed, while the remainder are movable relative to the frame 126. Some or all of the supports 132 also may be connected to each other, such as by cross-braces or the like. The supports 132 could also be fixedly connected to frame 126 at point 428. Other alternatives and variations will be apparent to persons of ordinary skill in the art in view of the present disclosure.

Figure 5:
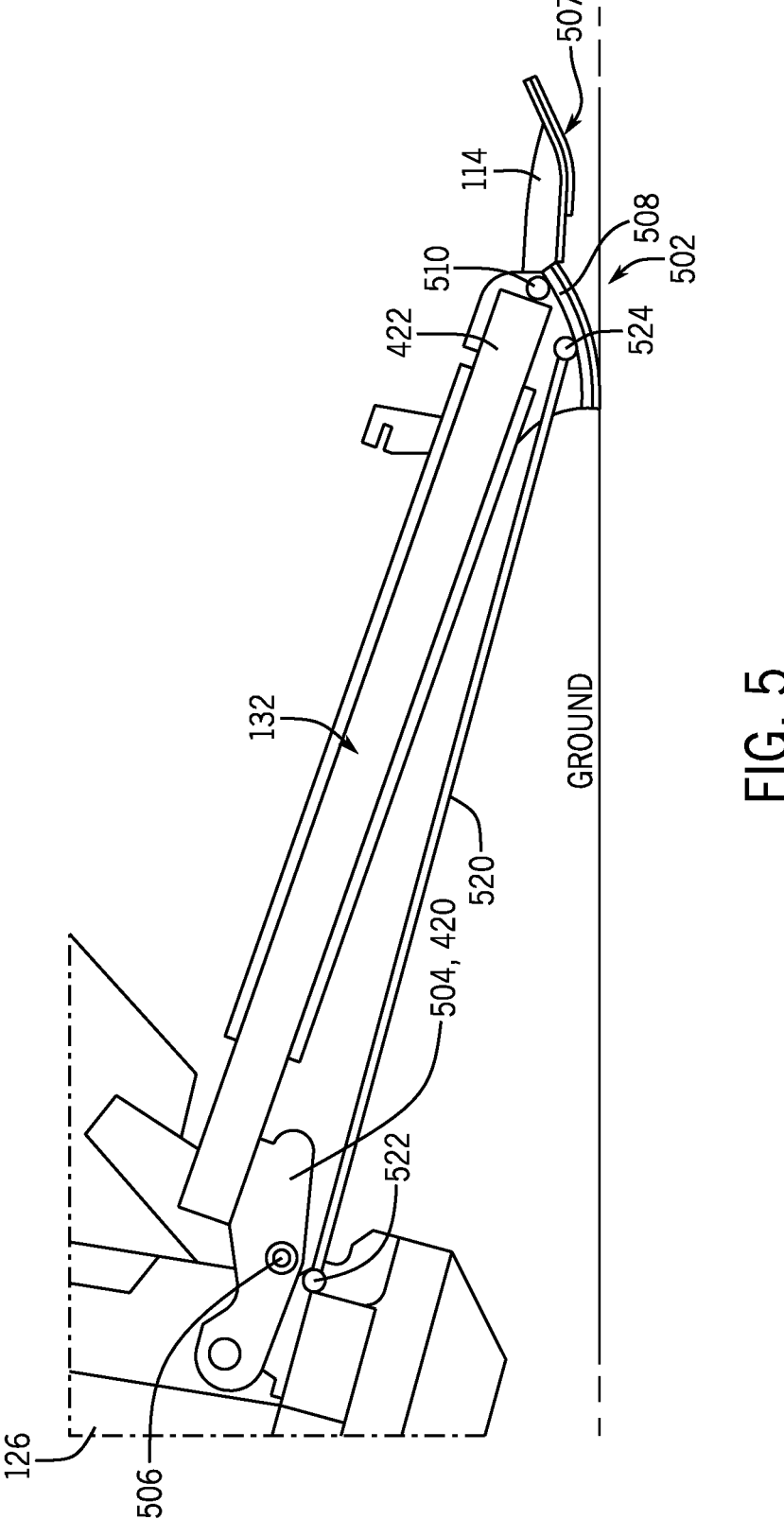
FIG. 5 is a side view of the flex arm of FIG. 4 that is coupled to a cutterbar by a four-bar linkage.

Turning now to FIG. 5, that figure depicts a detailed view of the support member 132 and cutterbar 114 mounted at the distal end of member 132.

Support member 132 has a proximal connection end 504 that is pivotably mounted to the header frame 126 at pivot point 506. It should be understood that member 132 rotates relative to frame 126 about pivot point 506; and connection end 504 is non-rotatably mounted to the remainder of member 132.

A cutterbar assembly 502 is pivotably mounted to the distal end 422 of member 132 at pivot point 510. More particularly, cutterbar assembly 502 generally includes (at least) a cutterbar frame 508 (may also be referred to as a skid shoe assembly), cutterbar 114 having knives, and a knife guard 507. Frame 508, cutterbar 114, and knife guard 507 are interconnected together. Frame 508 is pivotably connected to the distal end 422 of member 132 at pivot point 510. Cutterbar 114 is mounted within a slot or channel formed in frame 508, and is configured to reciprocate in a transverse direction within that channel, as is known in the art. Knife guard 507 is fixed to frame 508 and mounted forward of cutterbar 114, as is known in the art. It should be understood that the entire cutterbar assembly 502 is configured to pivot about pivot point 510 relative to support member 132.

A secondary link 520 is mounted between header frame 126 and cutterbar frame 508. More particularly, the proximal end of link 520 is pivotably mounted to header frame 126 about a pivot point 522. The distal end of link 520 is pivotably mounted to cutterbar frame 508 about a pivot point 524. Link 520 may be a rod, shaft or beam for example that is composed of either plastic or metal.

Each pivot point shown in FIG. 5 may comprise a pin, hinge, shaft, bolt or bearing, for example. It is noted that the pivot points only permit rotation and do not permit sliding or translation. Each of the pivot points extend laterally (i.e., transversely). The pivot points may comprise a hinge having knuckles and a pin passing through the knuckles. For example, pivot point 510 may comprise a knuckle that extends from the distal end of the member 132, a mating knuckle that extends from the cutterbar frame 508, and a pin that extends through both knuckles.

Figure 6A:
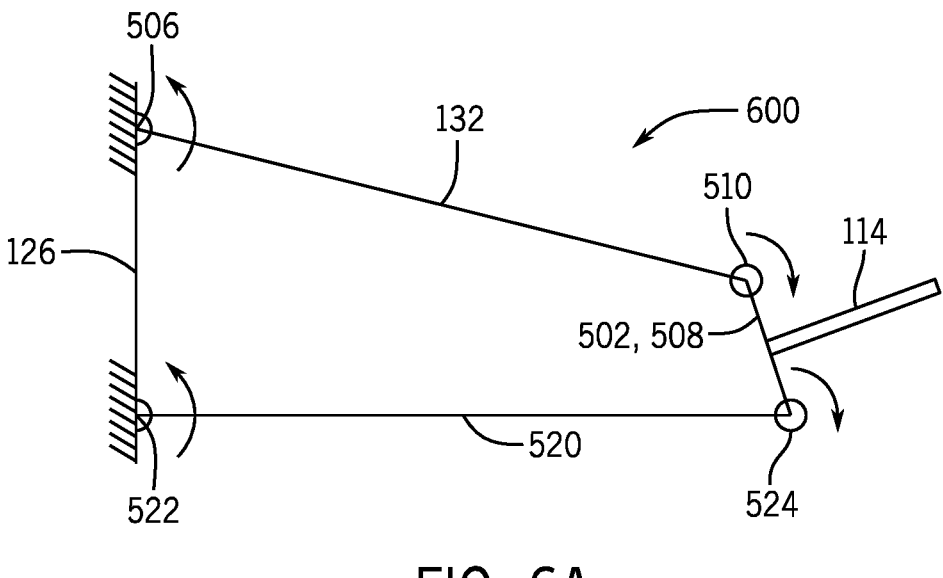
FIG. 6A shows a simplified schematic representation of the header as a four-bar linkage, wherein the four-bar linkage is shown flexed in a downward position.
Figure 6B:
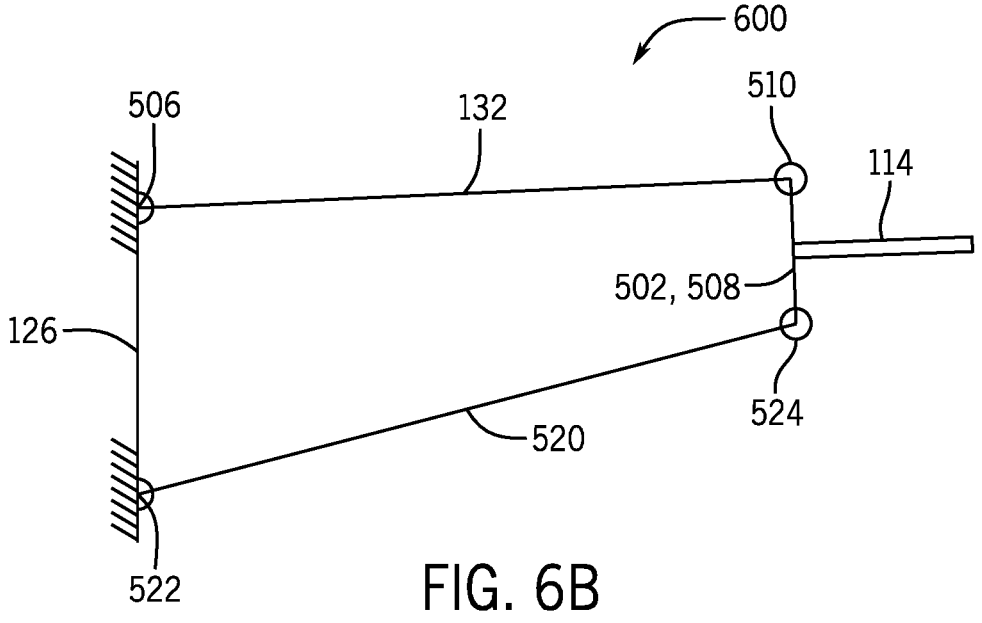
FIG. 6B depicts the four-bar linkage of FIG. 6A shown flexed in an upward position.

Turning now to FIGS. 6A and 6B, secondary link 520, support member 132, header frame 126 and cutterbar frame 508 together constitute a four-bar linkage 600, with the header frame 126 constituting the stationary link. The four-bar linkage 600 permits relative motion of cutterbar assembly 502 relative to support member 132. In contrast with conventional headers having floating support members with cutterbars fixed thereto, the cutterbar assembly 502 is capable of pivoting relative to the support member 132 thereby either preventing or limiting the cutterbar assembly 502 from digging into the ground. Stated differently, the four-bar linkage provides the cutterbar assembly 502 with greater angular range as compared with convention cutterbar assemblies.

In use, when the support member 132 is maintained at a position shown in FIG. 6A whereby the cutterbar assembly 502 can contact the ground with a sufficient force, the linkage 600 automatically adjusts (due to the ground reaction force) in the direction of the four arrows shown in FIG. 6A. As linkage 600 adjusts, the linkage 600 rotates to (or towards) the position shown in FIG. 6B to either prevent or limit the cutterbar assembly 502 from digging into the ground. It should be understood that the positions of the linkage 600 shown in FIGS. 6A and 6B may represent the maximum flexed positions.

Alternatively, a force sensor may be added to cutterbar assembly 502, and when the support member 132 is maintained at a position whereby the cutterbar assembly 502 contacts the ground with a sufficient force, as sensed by the sensor, an actuator may move the linkage 600 to either prevent or limit the cutterbar assembly 502 from digging into the ground. The actuator may be a piston, motor or solenoid that is connected to one of the links (e.g., 520, 132) of the linkage 600 for moving the linkage 600 in the direction of the arrows shown in FIG. 6, and then returning the linkage 600 to its starting position after a pre-determined time. The force sensor and/or the actuator may be omitted if so desired.

As an alternative to linkage 600, link 520 and joints 522 and 524 may be omitted. Thus, only joint 510 would remain, and cutterbar assembly 502 would remain pivotable with respect to support member 132.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed is:

1. A header for an agricultural vehicle, the header comprising:
   a header frame;
   at least one support member extending from a respective proximal end at the header frame to a respective distal end located forward of the header frame and a belt that directs crop toward a feederhouse of the agricultural vehicle, the at least one support member holding the belt for directing crop toward the feederhouse, and wherein the proximal end of the at least one support member is pivotably connected to the header frame;
   a cutterbar assembly mounted to the distal end of the support member; and
   a joint or linkage for pivotably connecting the cutterbar assembly to the at least one support member, wherein the linkage is a four-bar linkage comprising the header frame, the cutterbar assembly, the at least one support member, and a secondary link.

2. The header of claim 1, wherein the cutterbar assembly includes a cutterbar frame that is pivotably connected to the distal end of the at least one support member, and a cutterbar including a plurality of knives.

3. The header of claim 2, wherein the cutterbar reciprocates in a channel formed in the cutterbar frame.

4. The header of claim 2, wherein the secondary link includes a first end that is pivotably connected with respect to the header frame and a second end, opposite the first end, that is pivotably connected to the cutterbar frame.

5. The header of claim 2, wherein both the at least one support member and the secondary link are pivotably mounted to the cutterbar frame.

6. The header of claim 1, wherein the secondary link is positioned at an elevation below the at least one support member, and wherein a pivot joint interconnecting the secondary link to the header frame is positioned at an elevation below a pivot joint interconnecting the at least one support member to the header frame.

7. The header of claim 1, wherein the four-bar linkage moves in response to a ground reaction force applied at the cutterbar assembly.

8. The header of claim 1, wherein the header frame is connected directly to a feederhouse of the agricultural vehicle.

9. The header of claim 1, wherein the at least one support member comprises a plurality of support members extending parallel relative to each other.

10. The header of claim 9, wherein one or more of the plurality of support members is a driven roller for driving the belt that is positioned on the one of more of the plurality of support members.

11. The header of claim 9, wherein each of the plurality of support members supports one or more operative components, the one or more operative components including a draper belt roller or a portion of a cutterbar of the cutterbar assembly.

12. The header of claim 9, wherein a proximal end of each of the plurality of support members are movably mounted to the header frame.

13. The header of claim 1 further comprising a suspension system for adjusting an angular position of the support member relative to the header frame.

14. The header of claim 1, wherein none of the pivotable joints of the linkage either slide or translate.

15. A combine harvester comprising the header of claim 1.

16. An agricultural vehicle comprising the header of claim 1.

* * * * *